United States Patent
Huang

[11] Patent Number: 5,548,443
[45] Date of Patent: Aug. 20, 1996

[54] LIGHT SEPARATOR FOR TESTING DMD PERFORMANCE

[75] Inventor: Austin L. Huang, Dallas, Tex.

[73] Assignee: Texas Instruments Incorporated, Dallas, Tex.

[21] Appl. No.: 454,755

[22] Filed: May 31, 1995

[51] Int. Cl.⁶ .............................. G02B 27/14; G02B 5/04
[52] U.S. Cl. .................................... 359/638; 359/831
[58] Field of Search .................................. 359/638, 639, 359/640, 831

[56] References Cited

U.S. PATENT DOCUMENTS

| | | | |
|---|---|---|---|
| 3,547,513 | 12/1970 | Sheiner | 359/831 |
| 3,879,105 | 4/1975 | Broche | 359/831 |
| 3,925,813 | 12/1975 | Toyama | 348/338 |
| 4,580,879 | 4/1986 | Wilson | 359/640 |
| 4,643,538 | 2/1987 | Wilson | 359/641 |
| 4,681,435 | 7/1987 | Kubota | 356/71 |
| 4,697,882 | 10/1987 | Sato | 359/640 |
| 5,070,493 | 12/1991 | Marshall | 369/112 |
| 5,281,802 | 1/1994 | Kitabayashi | 250/201.5 |
| 5,339,196 | 8/1994 | Grebe | 359/640 |
| 5,481,324 | 1/1996 | Sekine | 354/152 |

Primary Examiner—Georgia Y. Epps
Assistant Examiner—Ricky Mack
Attorney, Agent, or Firm—Julie L. Reed; James C. Kesterson; Richard L. Donaldson

[57] ABSTRACT

A light separator (20) for testing the tilt angles of mirror elements (21) of a digital micro-mirror device. The light separator (20) is comprised of two triangular prisms (23, 25). A bottom prism (23) receives light from all mirror elements (21). It transmits light from all mirror elements having a tilt angle over a specified angle (21a, 21b) from a different face than light from mirror elements having a tilt angle less than the specified angle (21c). A top prism (25) receives light from one face of the bottom prism (23). It further divides the light, so that light from all mirror elements having a tilt angle within a specified range (21a) is transmitted from one face and light from other mirror elements (21b) is transmitted from another face.

18 Claims, 3 Drawing Sheets or more mirror

LIGHT SEPARATOR FOR TESTING DMD PERFORMANCE

TECHNICAL FIELD OF THE INVENTION

This invention relates to digital micro-mirror devices (DMDs), and more particularly to an optical device for testing performance of DMDs, specifically the extent to which its mirror elements are tilting at a desired angle.

BACKGROUND OF THE INVENTION

Digital micro-mirror devices (DMDs), are used for various applications, and most commonly as a spatial light modulator for imaging applications. The DMD has an array of thousands of tiny tilting mirrors. To permit the mirrors to tilt, each is attached to one or more hinges mounted on support posts, and spaced by means of an air gap over underlying control circuitry. The control circuitry provides electrostatic forces, which cause each mirror to selectively tilt. The mirror tilts in one direction (off) and in another direction (on), thereby modulating the light incident on its surface. Light reflected from on mirrors passes through imaging optics and to the image plane. Light from the off-mirrors is reflected away from the image plane.

U.S. patent Ser. No. 08/171,303, entitled "Improved Multi-level Digital Micromirror Device", provides a comprehensive description of a "hidden hinge" type DMD and its use in imaging applications. Other types of DMDs are described in the following patents: U.S. Pat. No. 4,566,935, entitled "Spatial Light Modulator and Method"; U.S. Pat. No. 4,615,595, entitled "Frame Addressed Spatial Light Modulator"; U.S. Pat. No. 4,662,746, entitled "Spatial Light Modulator and Method"; U.S. Pat. No. 5,061,049, entitled "Spatial Light Modulator and Method"; U.S. Pat. No. 5,083,857, entitled "Multi-Level Deformable Mirror Device"; and U.S. Pat. No. 5,096,279, entitled "Spatial Light Modulator and Method." These patents and patent applications are assigned to Texas Instruments Incorporated and are incorporated by reference herein.

As a result of manufacturing problems, it may happen that one or more mirror elements of a DMD do not tilt at the correct angle on or off. It is desirable to have some means of testing DMDs for such defects.

SUMMARY OF THE INVENTION

One aspect of the invention is a light separator for testing the tilt angles of the mirror elements of a digital micro-mirror device. The mirror elements have various tilt angles that are within a range of correct-tilted angles, or that are over-tilted angles, or that are under-tilted angles. A bottom prism has a first face for receiving light from all mirror elements. The bottom prism also has a second face, which is angled with respect to the first face such that the second face transmits light from mirror elements having correct-tilted angles and having over-tilted angles and such that the second face internally reflects light from mirror elements having under-tilted angles. A top prism has a first face angled with respect to the second face of the bottom prism such that the first face receives light transmitted from the second face of the bottom prism. The top prism also has a second face angled with respect to its first face such that it transmits light from mirror elements having correct-tilted angles and such that it internally reflects light from mirror elements having over-tilted angles. In this manner, all light that is not from mirror elements having tilt angles within the range of correct-tilt angles is filtered away from the path of light from correctly tilting mirror elements.

An advantage of the invention is that it provides a simple test of DMD tilt angles. The entire DMD can be tested to determine how many of its mirror elements tilt within a specified tolerance of a desired tilt angle. For example, all mirror elements can be turned on, and the detected illumination compared with the illumination that should be provided if all mirror elements are correctly tilted. The amount of illumination provided by mirror elements that are not correctly tilting can also be measured. Thus, it can be determined not only whether any mirror elements are operating improperly, but also how much light is being misdirected.

DETAILED DESCRIPTION OF THE INVENTION

Figure 1:
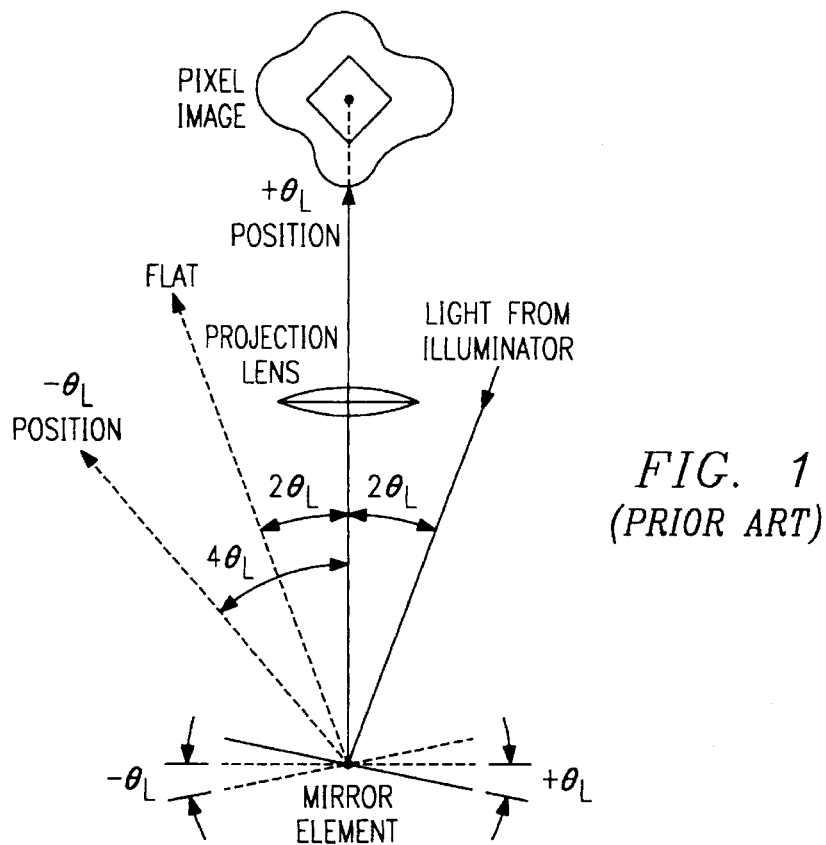
FIG. 1 illustrates the tilt angles of a single mirror element of a DMD.

FIG. 1 illustrates the tilt angles of a single mirror element of a DMD. As discussed in the Background, a typical DMD is an array of thousands of such mirror elements, which must all tilt at substantially the same on angle and at substantially the same off angle.

This invention is directed to a light separator for determining whether the mirror elements of a DMD are operating at the correct tilt angles. The invention is applicable to a number of different types of mirror element designs, including those known as the "torsion hinge" and "hidden hinge" designs. These and other DMD designs are described in the patents and patent application referenced in the Background.

In FIG. 1, the DMD is coupled with dark field projection optics. A bright light source is directed to the mirror elements at an angle to their surface. Mirror elements at an angle of $+\theta_L$ the mirror surface (the on mirrors) reflect the light from the illuminator through the projection lens and onto the screen. The off mirror elements, at $-\theta_L$, and flat surfaces such as support posts, reflect light away from the projection lens and toward a light absorbing material.

In the example of this description, the light source is directed to the DMD surface at an angle of approximately 70°, or equivalently, 20° relative to an axis perpendicular to the surfaces of the mirror elements. Mirror elements tilted +10° (on) will then reflect the incoming light by a −20° angle through a projection lens and onto a screen. Mirror elements tilted −10° (off) will reflect the path of the incident light by −60° so as to miss the projection lens aperture and strike a light absorber. Likewise, flat surfaces, such as hinges and support post tops, will reflect the incident light by −40°, so that it also misses the projection lens.

Figure 2:
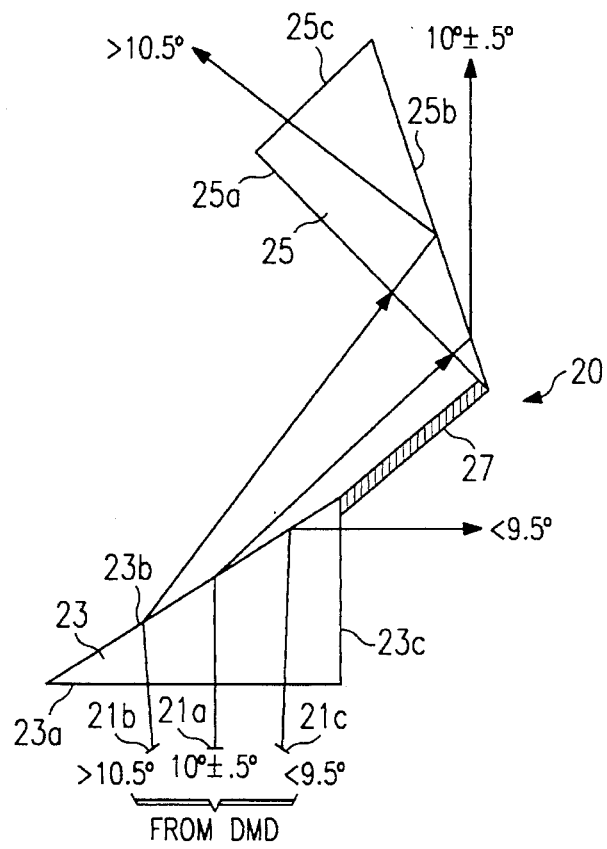
FIG. 2 illustrates a light separator in accordance with the invention.

FIG. 2 illustrates a light separator 20 in accordance with the invention. In operation, separator 20 is used to test one or more mirror elements 21. All mirror elements 21 being tested are addressed so that they should be either on or off. One or more mirror elements 21a may be "correct-tilted" at an angle of 10° with a 0.5° tolerance. One or more mirror elements 21b may be "over-tilted", at an angle of more than 10.5°. One or more mirror elements 21c may be "under-tilted", at an angle of less than 9.5°.

Filter 20 comprises a two prisms 23 and 25, which are referred to herein as "bottom" prism 23 and "top" prism 25. This designation is for convenience of description, with the "bottom" prism 23 being the one that first receives light from the DMD. Both prisms 23 and 25 are triangular prisms, having three faces whose angles are designed to receive light at one face, and depending on the incident angle of the incoming light rays, transmit some light through a second face or some light through a third face, or light through both faces. In the example of this description, prisms 23 and 25 are right angle prisms, but this is not necessary so long as the prescribed angles between the first and second faces, as described below, are maintained.

For purposes of this description, is it assumed that prisms 23 and 25 are glass, with an index of refraction, n=1.517. For the interface between air and glass, the critical angle for total internal reflection, $\theta_{critical}$, is 41.23°.

Bottom prism 23 receives light from all mirror elements 21 at a first face, 23a. Prism 23 is oriented with respect to the surfaces of the mirror elements 21 so that light from the correct-tilted mirror elements 21a is normal to the first face 23a. All light is transmitted to a second face 23b. As explained below in connection with FIG. 3, prism 23 is geometrically designed so that light from the under-tilted mirror elements 21c is internally reflected and transmitted from prism 23 at a third face 23c. Light from the correct-tilted mirror elements 21a and from the over-tilted mirror elements 21b is transmitted from prism 23 at its second face 23b.

Top prism 25 receives light from the correct-tilted mirror elements 21a and from the over-tilted mirror elements 21b. It is oriented with respect to bottom prism 23 so that the light from the correct-tilted mirror elements 21a is normal to a first face 25a. All light is transmitted to a second face 25b. As explained below in connection with FIG. 4, top prism 25 is geometrically designed so that light from the from the over-tilted mirror elements 21c is internally reflected and transmitted from prism 25 at a third face 25c. Light from the correct-tilted mirror elements 21a is transmitted from prism 25 at the second face 25b.

Figure 3:
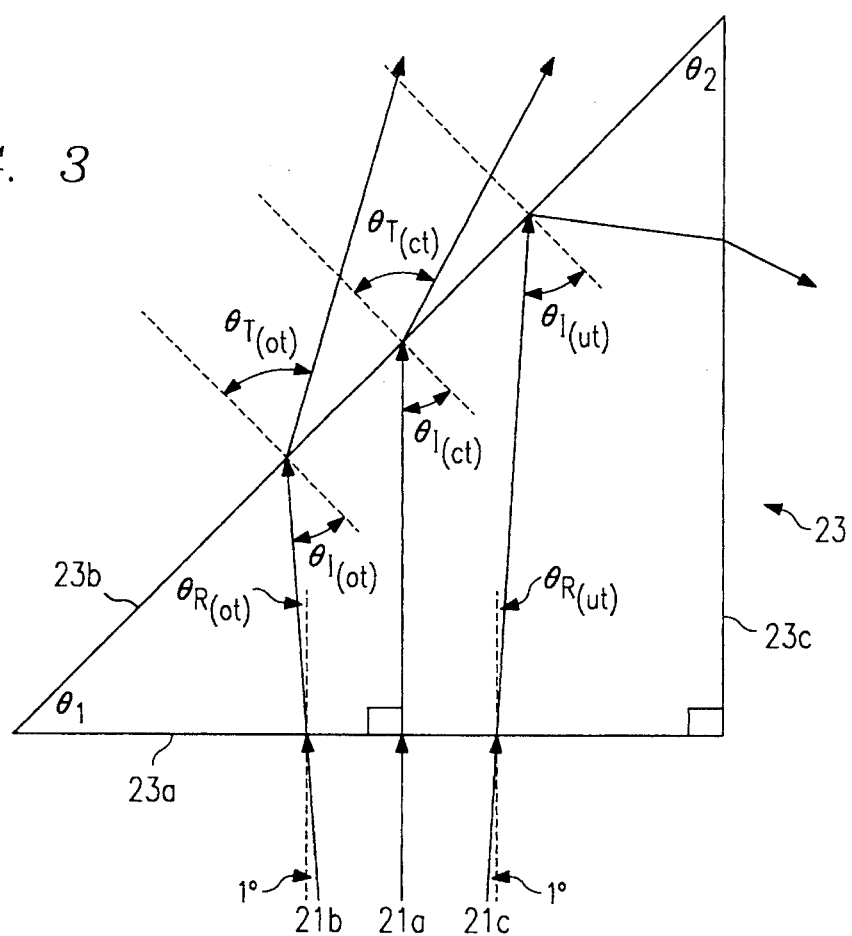
FIG. 3 illustrates the bottom prism of FIG. 2.

FIG. 3 illustrates bottom prism 23 in further detail. As in FIG. 2, light from all mirror elements 21 enters a first face 23a, with light from the correct-tilted mirror elements 21a entering at an incident angle of 90°. Light from the under-tilted mirror elements 21c and from the over-tilted mirror elements 21b enters the first face 23a at incident angles of 1 degree off the normal. The angle of refraction of light from these mirror elements 21b and 21c is calculated, using known optics principles as:

$\sin 1° = 1.517 \sin \theta$ $\theta = \sim 0.659$ degrees.

This angle, identified as $\theta_{R(ut)} = \theta_{R(ot)}$, is the same for light from the under-tilted mirror elements 21b and the over-tilted mirror elements 21c.

The angle between the first face 23a and the second face 23b of prism 23, θ1, is such that light from the under-tilted mirror elements 21c will be incident on the second face 23b at an angle slightly greater than the critical angle. As a result, that light will be internally reflected to a third face 23c. At the same time, θ1 is such that the light from the correct-tilted mirror elements 21a will be incident on the second face 23b at an angle slightly less than the critical angle, so that light will be transmitted from the second face 23b.

Where $\theta_{I(ct)}$ is the angle of incidence of the correct-tilted mirror elements 21a and $\theta_{I(ut)}$ the angle of incidence of the under-tilted mirror elements 21c:

$\theta_{I(ct)} < \theta_{critical} < \theta_{I(ut)}$.

It follows that the light from the over-tilted mirror elements 21c will be transmitted from the second face 23b.

For purposes of example, $\theta_{I(ct)}$ is 40.65° which is slightly less than the critical angle. Because prism 23 is a right angle prism, $\theta_1 = \theta_{I(ct)}$. The resulting angles of incidence are 40.65° for the light from mirror elements 21a and 41.309° for the light from mirror elements 21c. This meets the above requirement because 40.65°<41.23°<41.309°.

The angle of incidence of light from the over-tilted mirror elements 21b is $\theta_{I(ot)} = 39.99$ (40.65°−0.659°). Where the angle between the first face 23a and the third face 23c is 90°, it follows that the angle between the second face 23b and the third face 23c, θ2, is 49.35°.

The angles, with respect to normal, that light exits from the second face 23b of bottom mirror 23 are calculated as follows:

$\sin \theta_{T(ot)} = 1.517 \sin 40.65°$ $\theta_{T(ot)} = \sim 81.200$, and $\sin \theta_{T(ct)} = 1.517 \sin 39.99°$ $\theta T(ct) = \sim 77.141$.

As explained below, these angles are used to calculate the angle between the two prisms 23 and 25.

Figure 4:
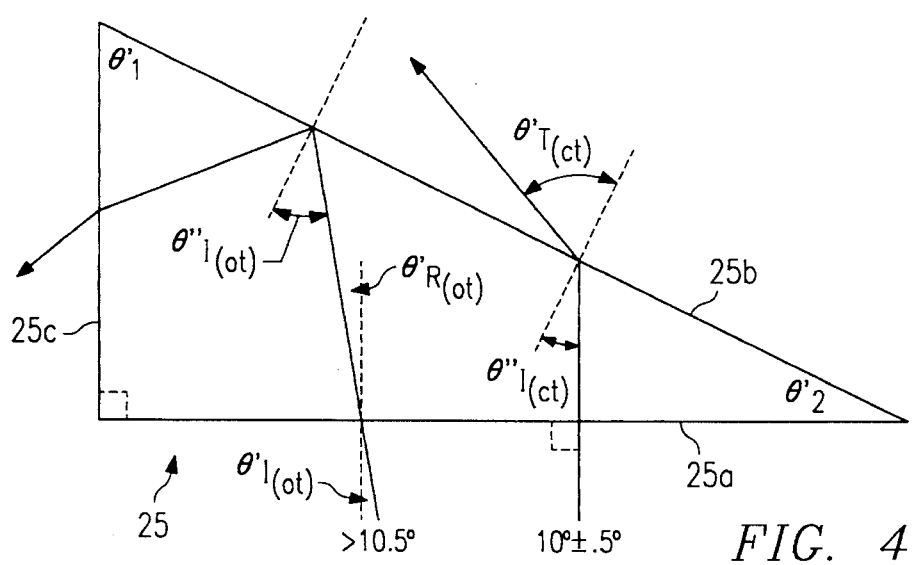
FIG. 4 illustrates the top prism, of FIG. 2.

FIG. 4 illustrates top prism 25 in further detail. Light from bottom prism 23 enters a first face 25a of top prism 25. Top prism 25 is oriented with respect to bottom prism 23 such that the light from the correct-tilted mirror elements 21a enters the first face 25a at an incident angle of 90°. This orientation of top prism 25 with respect to bottom prism 23 can be determined with simple geometric calculations. Referring again to FIG. 2, some sort of frame 27 can be used to hold the two prisms 23 and 25 in place.

Figure 5:
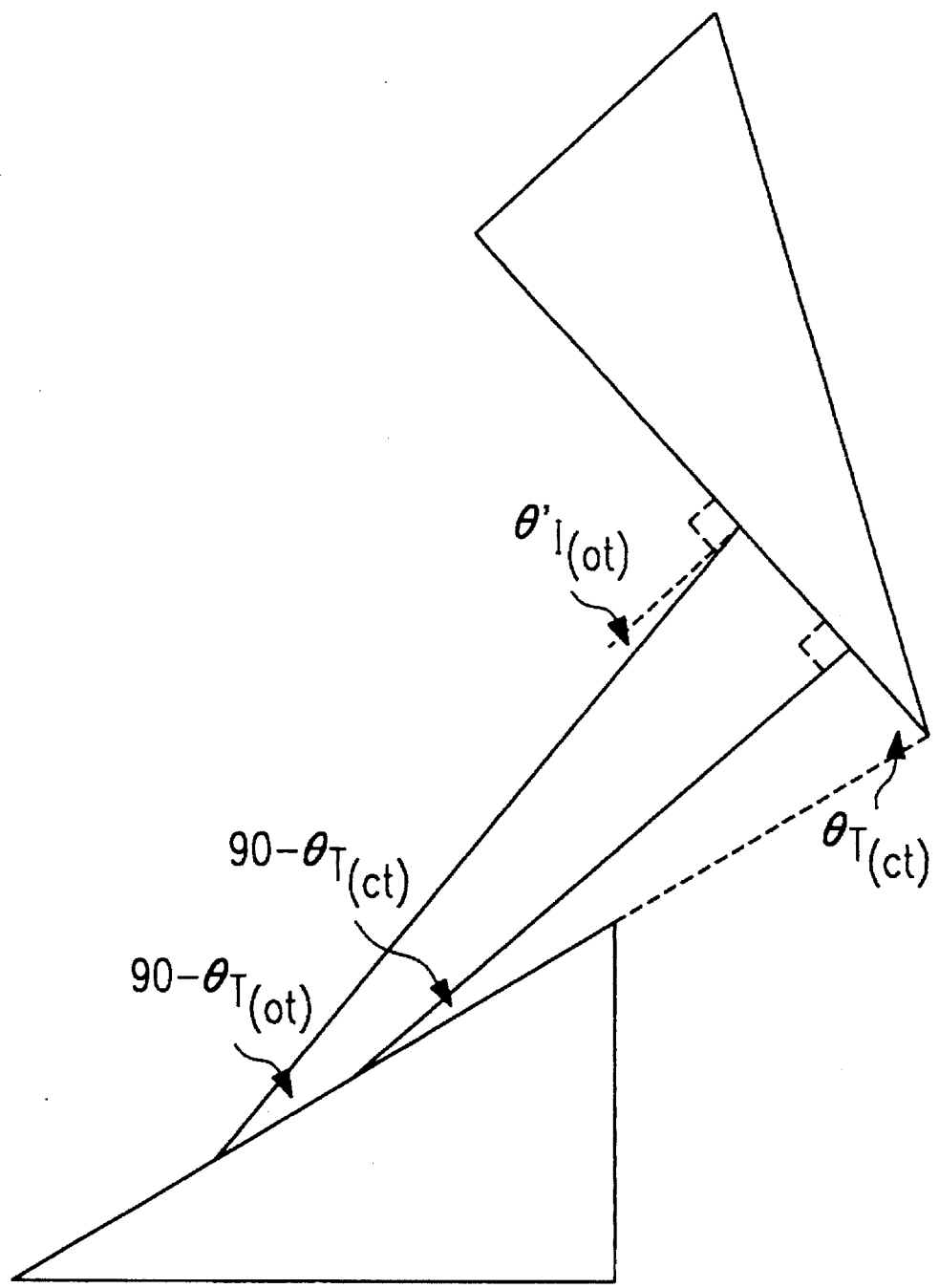
FIG. 5 illustrates the calculations for orienting the bottom prism with respect to the top prism.

The angle of incidence of light from the over-tilted mirrors on the first face of prism 25 can be calculated using geometric principles. More specifically, and referring to FIG. 5:

$180° = [90 - \theta'_{I(ot)}] + \theta_{T(ct)} + (90 - \theta T(ot))$ $0 = -\theta'_{I(ot)} + \theta_{T(ct)} - \theta_{T(ot)}$ $\theta'_{I(ot)} = \theta_{T(ct)} - \theta_{T(ot)}$ In the example of this description, $\theta'_{I(ot)}$ is approximately 4.06° (~81.200°−77.141°).

As with the second face 23b of bottom prism 23, the angles of incidence on the second face 25b of top prism must be correctly determined. These angles are determined by the angle between the first face 25a and the second face 25b. This angle, $\theta_1'$, is such that light from the over-tilted mirror elements 21b will be incident on the second face 25b at an angle slightly greater than the critical angle. Accordingly, that light will be internally reflected to a third face 25c. At the same time, this angle is such that the light from the correct-tilted mirror elements 21*a* will be incident on the second face 25*b* at an angle slightly less than the critical angle, so that light will be transmitted from the second face 25*b*.

Where $\theta''_{I(ct)}$ is the angle of incidence of the correct-tilted mirror elements 21*a*, and $\theta''_{I(ot)}$ is the angle of incidence of the over-tilted mirror elements 21*b*:

$$\theta''_{I(ct)} < \theta_{critical} < \theta''_{I(ot)}$$

In this example, the angle between the first face 25*a* and the second face 25*b*, $\theta'_1$, is 38.7°. Because prism 25 is a right angle prism, $\theta'_1 = \theta''_{I(ct)}$. The resulting angles of incidence are 38.7° for the light from mirror elements 21*a* and ~41.374° for the light from mirror elements 21*b*. This meets the above requirement because $$38.7° < 41.23° < 41.37°.$$

Where the angle between the first face 25*a* and the third face 25*c* is 90°, it follows that the angle between the second face 25*b* and the third face 25*c*, $\theta'_2$, is 51.3°.

The above description is in terms of a separator 20 whose bottom prism 23 filters out light from under-tilted mirror elements 21*c* and whose top prism 25 filters out light from over-tilted mirror elements 21*b*. However, a similar separator could be constructed whose bottom prism filters out light from over-tilted mirror elements 21*b* and whose top prism filters out light from under-tilted mirror elements 21*c*. In the example of this description, this could be easily accomplished using the same prisms 23 and 25 but reversing their left-right orientation. Thus, the right angle of prism 23 would be closest to the light from the over-tilted mirror elements 21*b* rather than closest to the under-tilted mirror elements 21*c*. This is deemed an equivalent device, such that the words "under-tilted" and "over-tilted" could be used interchangeably, with this change in the orientation of the prisms.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A light separator for testing the tilt angles of one or more mirror elements of a digital micro-mirror device, said mirror elements having tilt angles within a range from under-tilted to over-tilted angles, comprising:

a triangular bottom prism having three faces, a first face for receiving light from individual ones of an away of mirror elements, and a second face angled with respect to the first face such that said second face transmits light from said mirror elements having correct-tilted angles and having over-tilted angles and internally reflects light from said mirror elements having under-tilted angles; and a triangular top prism having three faces, a first face angled with respect to said second face of said bottom prism such that said second face of said bottom prism such that said first face receives said light transmitted from said face of said bottom prism, said top prism also having a second face angled with respect to its first face such that said second face transmits said light from said mirror elements having correct-tilted angles and internally reflects said light from said mirror elements having over-tilted angles.

2. The light separator of claim 1, wherein said first face of said bottom prism is angled with respect to a third face of said bottom prism at a right angle.

3. The light separator of claim 1, wherein said first face of said top prism is angled with respect to a third face of said top prism at a right angle.

4. The light separator of claim 1, wherein said third face of said bottom prism has an angle with respect to said second face such that said third face transmits light reflected from said second face out of said bottom prism.

5. The light separator of claim 1, wherein said third face of said top prism has an angle with respect to said second face such that said third face transmits light reflected from said second face out of said top prism.

6. The light separator of claim 1, wherein said first face is angled with respect to said second face of said bottom prism such that light from said mirror elements having correct-tilted angles is incident on said first face at an angle of ninety degrees.

7. The light separator of claim 1, wherein the angle of incidence of light from said mirror elements having correct-tilted angles on said second face of said bottom prism is slightly less than the critical angle of said bottom prism.

8. The light separator of claim 1, wherein the angle of incidence of light from said mirror elements having correct-tilted angles on said second face of said top prism is slightly less than the critical angle of said top prism.

9. The light separator of claim 1, wherein said bottom prism transmits light from said mirror elements having correct-tilted and under-tilted angles and internally reflects light from said mirror elements having over-tilted angles, and wherein said top prism internally reflects light from said mirror elements having under-tilted angles.

10. A method of testing the tilt angles of one or more mirror elements of a digital micro mirror device, said mirror elements having tilt angles within a range of angles from under-tilted to over-tilted angles, comprising the steps of:

receiving light reflected from individual ones of an array of mirror elements into a first face of a triangular bottom prism having three faces, said bottom prism also having a second face angled with respect to its first face such that said second fact transmits light from said mirror elements having correct-tilted angles and having over-tilted angles and internally reflects light from said mirror elements having under-tilted angles; and receiving light transmitted from said second face of said bottom prism into a first face of a triangular top prism having three faces, said top prism also having a second face angled with respect to its first face such that it transmits said light from said mirror elements having correct-tilted angles and internally reflects said light from said mirror elements having over-tilted angles.

11. The method of claim 10, wherein said first face of said bottom prism is angled with respect to a third face of said bottom prism at a right angle.

12. The method of claim 10, wherein said first face of said top prism is angled with respect to a third face of said top prism at a right angle.

13. The method of claim 10, wherein said third face of said bottom prism has an angle with respect to said second face such that said third face transmits light reflected from said second face out of said bottom prism.

14. The method of claim 10, wherein said third face of said top prism has an angle with respect to said second face such that said third face transmits light reflected from said second face out of said top prism.

15. The method of claim 10, wherein said first face is angled with respect to said second face of said bottom prism such that light from said mirror elements having correct-tilted angles is incident on said first face at an angle of ninety degrees.

16. The method of claim 10, wherein the angle of incidence of light from said mirror elements having correct-tilted angles on said second face of said bottom prism is slightly less than the critical angle of said bottom prism.

17. The method of claim 10, wherein the angle of incidence of light from said mirror elements having correct-tilted angles on said second face of said top prism is slightly less than the critical angle of said top prism.

18. The method of claim 10, wherein said bottom prism transmits light from said mirror elements having correct-tilted and under-tilted angles and internally reflects light from said mirror elements having over-tilted angles, and wherein said top prism internally reflects light from said mirror elements having under-tilted angles.

* * * * *